D. M. READ & L. PRAHAR.

Pocket-Book Frames.

No. 8,408. Reissued Sept. 10, 1878.

Witnesses:

Hugh Jonce

Inventors.

Daniel M. Read

Louis Prahar by their atty. L. D. Lam

THE NORRIS PETERS CO., PHOTO-LITHO., WASHINGTON, D. C.

UNITED STATES PATENT OFFICE.

DANIEL M. READ AND LOUIS PRAHAR, OF NEW YORK, N. Y.

IMPROVEMENT IN POCKET-BOOK FRAMES.

Specification forming part of Letters Patent No. 200,340, dated February 12, 1878; Reissue No. 8,408, dated September 10, 1878; application filed July 12, 1878.

*To all whom it may concern:*

Be it known that we, DANIEL M. READ and LOUIS PRAHAR, of the city, county, and State of New York, have invented a new and useful Improvement in Pocket-Book Frames, of which the following is a specification:

The object of this invention is to furnish improved pocket-book frames which shall be so constructed as to prevent small coins from escaping between the sides of the frame when closed, and which shall be simple in construction and inexpensive in manufacture.

The invention consists in the combination, with one side of a pocket-book frame, and attached thereto, of a cap-plate of sufficient width to cover both sides of the frame when closed against each other; in the combination, with such cap-plate, of a catch-socket and spring bolt or catch; and in the catch plate or socket, having a point, and the catch-bolt having a bottom slot or groove to receive such point, in combination with the socket and frames, as hereinafter fully described.

Figure 1:
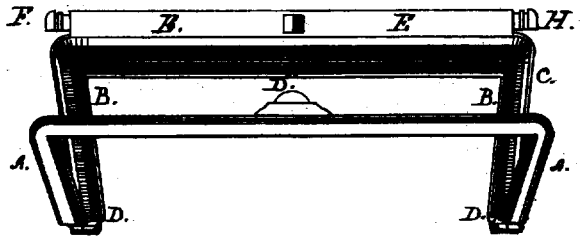
Figure 2:
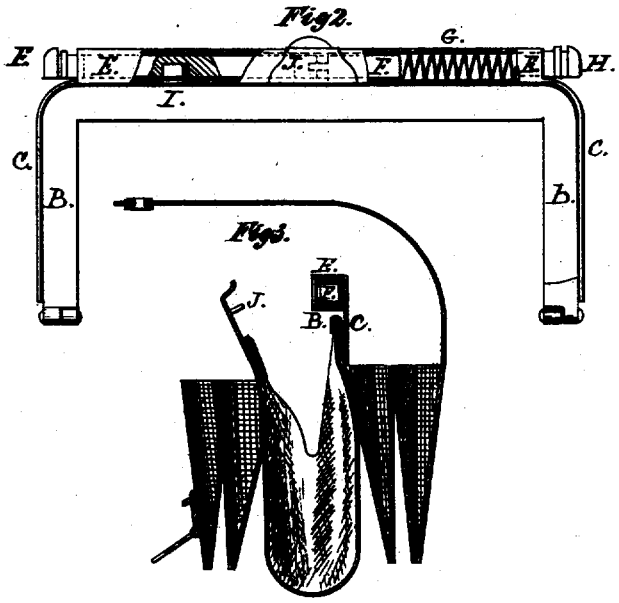
Figure 4:
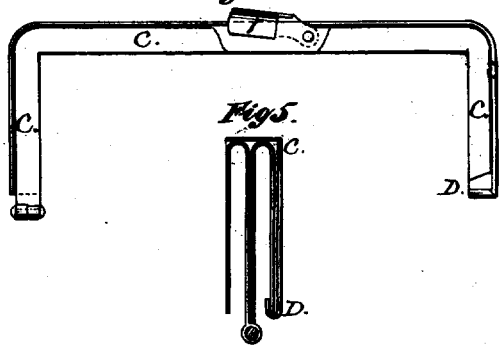

Figure 1 is a front view of one of the frames opened, with the cap-plate and catch socket and bolt attached. Fig. 2 is a side view of the same closed, and partly in section to show the construction. Fig. 3 is a cross-section of the same, shown as applied to a pocket-book. Fig. 4 is a detail view of one side of the frame and of the cap-plate, shown without the catch-socket. Fig. 5 is a detail cross-section of the frame and cap-plate, shown without the catch-socket.

Similar letters of reference indicate corresponding parts.

A and B represent the sides of an ordinary pocket-book frame, which are hinged to each other at their ends in the usual way. C is the cap-plate, which is made angular in form to fit upon the side B of the frame, and its upper or cap flange is made of such a width as to overlap or cover the top and ends of the two sides A and B when the frame is closed, as shown in Figs. 3 and 5.

The cap-plate C may be attached to the frame so that it can be detached therefrom by means of hooks D, formed upon the ends or side edges of the cap, as shown in Figs. 1, 4, and 5, to be bent or closed down over the edge of the side B of the frame, or formed on the edge of the side of the frame, to be bent down over the edge of the cap-plate.

When the sides A and B are fastened with an ordinary clasp, 1, instead of by the spring socket or catch F, the cap-plate C may be secured to the side B of the frame by the rivet that fastens the clasp, as shown in Fig. 4, or otherwise permanently, as desired.

E is the catch-socket, which is formed in one piece with the cap-plate C, and is bent over three times at right angles. F is the catch-bolt, which is slipped into one end of the socket E, and has an ornamental head or knob formed upon its outer end. The inner end of the bolt F rests against the end of the coiled spring G, the other end of which rests against a knob or head, H, secured in the other end of the socket E, and made similar to the knob or head upon the end of the bolt F. The bolt F is secured in the socket E by cutting a point, I, in the body of the cap-plate C and bending it up into a slot in the said bolt F, as shown in Fig. 2. The catch J is secured to the side A of the frame, passes through a hole in the forward side of the socket E, and enters a hole in the bolt F.

Having thus described our invention, we claim as new, and desire to secure by Letters Patent—

1. The combination, with one side of a pocket-book frame, of a detachable cap-plate, C, secured in place thereon by hooks D, formed upon one of said parts and bent over the edge of the other part, substantially as shown and described.

2. The combination, with one side of a pocket-book frame, B, of a cap-plate, C, attached thereto by a rivet or equivalent fixed fastening, substantially as shown and described.

3. The combination, with the cap-plate C, of the catch-socket E, formed in one piece with the cap and attached to one side of the frame A B, substantially as shown and described.

4. The cap-plate C, having the point I, and the catch-bolt F, having a bottom slot or groove adapted to receive said point, in combination with the socket E and frames A B, as and for the purposes set forth.

DANIEL M. READ.
LOUIS PRAHAR.

Witnesses:
S. D. LAW,
S. NELSON WHITE.